Nov. 3, 1964

R. WENDLENNER 3,155,614

SELF DRAINING FILTER ASSEMBLY

Filed Jan. 23, 1961

INVENTOR.
RUDOLF WENDLENNER

BY *Lyon & Lyon*

ATTORNEYS.

United States Patent Office 3,155,614
Patented Nov. 3, 1964

3,155,614
SELF DRAINING FILTER ASSEMBLY
Rudolf Wendlenner, Sun Valley, Calif., assignor to Westward Engineering & Fabricating Co., Paramount, Calif., a corporation of California
Filed Jan. 23, 1961, Ser. No. 83,991
5 Claims. (Cl. 210—452)

This invention relates to liquid filtering apparatus and is particularly directed to a filter assembly for filtering highly toxic or pungent liquids.

Many of the liquid fuels used in rockets and missiles are extremely toxic or pungent and after filling the rocket or missile, it it desirable and sometimes necessary that no fuel remain in the filling system so that it may be disassembled or maintenance performed. In an ordinary filling system a filter is installed to extract solid impurities from the fuel while filling the rocket or missile.

The filter oftens forms an undesirable trap for a portion of the fuel since the physical construction does not permit complete drainage under normal conditions.

A filter ordinarily requires intermittent inspection and maintenance and therefore must be capable of disassembly.

Accordingly it is the principal object of this invention to provide a filter assembly which is provided with means for completely draining the filter assembly automatically upon exhausting the fluid from the fluid system.

Another object of this invention is to provide a filter assembly in which means are provided for opening the assembly for maintenance and inspection without disassembly from the connecting fuel lines.

Another object of this invention is to provide a liquid fuel filtering assembly of this type which is self-draining to prevent any fuel from being trapped to remain in the filter assembly after the rocket or missile has been fueled.

Other and more detailed objects and advantages of this invention will appear from the following description and the accompanying drawings.

Figure 1:
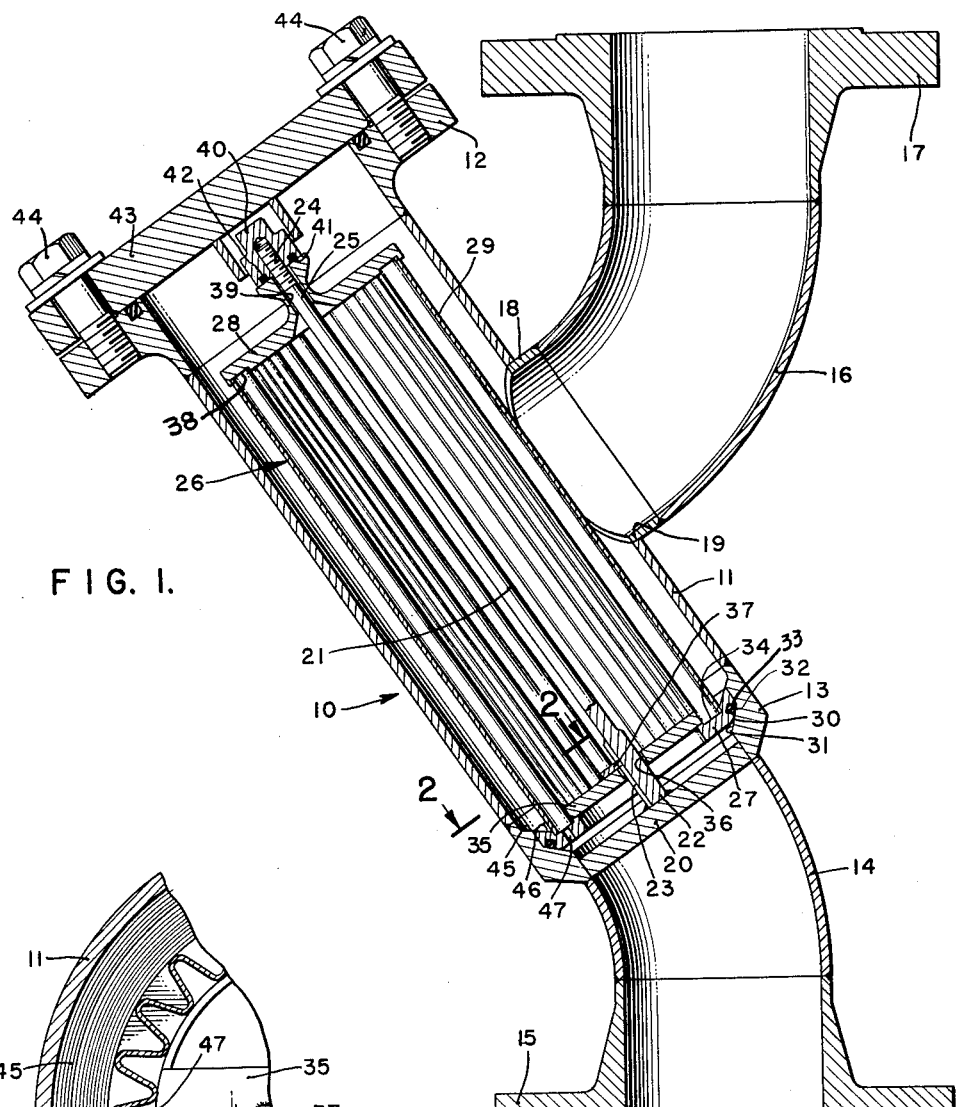

In the drawings:
FIGURE 1 is a sectional elevation of the filter assembly constituting the preferred embodiment of this invention.

Figure 2:
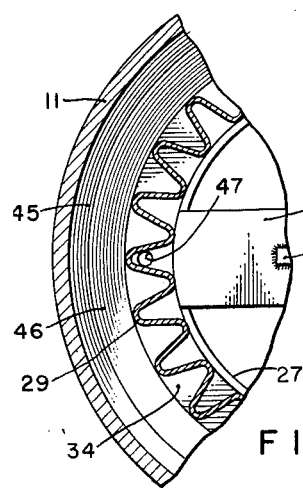

FIGURE 2 is an enlarged sectional view taken substantially on line 2—2 of FIGURE 1.

Referring to the drawings, the filter assembly generally designated 10 includes a cylindrical housing 11 having a flange 12 on the upper end and a sleeve 13 on the lower end. An elbow shaped conduit 14 is secured to the sleeve 13 and provided with a flange 15 for attachment to another flanged conduit (not shown). A second elbow shaped conduit 16 also provided with a flange 17 for attachment to another flanged conduit (not shown) is secured to a sleeve 18. The sleeve 18 is fixed to an opening 19 in the side of the cylindrical housing 11.

A support bar 20 is secured in the lowermost portion of sleeve 13 and said support bar is sufficiently narrow to present no appreciable obstruction to fluid flow through sleeve 13. A rod 21 extending the length of the housing 11 is axially aligned and concentric with said housing and has its lower end 22 secured to the support bar 20.

The rod 21 is provided with an axially extending groove 23 on the lower end 22 and a threaded portion 24 on the upper end 25.

A filter element assembly, generally designated 26, includes a lower retainer ring 27, an upper retainer cap 28 and a cylindrical filter element 29. The filter element 29 is constructed of a fine mesh screen forming a cylinder open on both ends and having corrugations extending axially to increase the surface area and strength.

The retainer ring 27 is provided with a tapered surface 30 to fit the tapered surface 31 of the sleeve 13. A groove 32 in the surface 30 is provided for retaining an O-ring 33 or other convenient sealing means. The annular surface 34 on ring 27 is adapted to receive one end of filter element 29. A guide bar 35 is secured to the ring 27 and includes a centrally disposed aperture 36 which receives the lower end 22 of rod 21. A guide key 37 secured to the guide bar 35 cooperates with the groove 23 to prevent rotation of the ring 27.

The retainer cap 28 has an annular surface 38 fitting the top of the filter element 29 and a central aperture 39 fitting the rod 21. A threaded nut 40 with annular surface groove 41 containing an O-ring 42 is threaded onto the threaded portion 24 of rod 21.

A cover plate 43 is secured to the flange 12 by any convenient means such as bolts 44.

The interior surface 45 of sleeve 13 and the upper surface 46 of ring 27 is tapered inwardly and downwardly at an angle greater than the angle the axis of the housing 11 makes with a vertical axis whereby any liquid present therein will drain downwardly and toward the housing axis from the surfaces 45, 46.

An aperture 47 is provided in the ring 27 and extends downwardly from the surface 34 and is positioned at the lowest point of the said surface 34. The filter element 29 is positioned, as shown in FIGURE 2, with the outermost portion of a corrugation angularly aligned with the aperture 47 thereby preventing communication between the said aperture and the exterior of the filter element.

In operation, the filter assembly 10 is installed in the fuel line by means of the flanges 15 and 17 such that the axis of housing 11 is not vertical, and the cover plate 43 is installed after assembly of the filter element 29, ring 27, cap 28 and nut 40. The fuel enters the housing 11 through conduit 16 and is permitted to flow around the filter element 29 in the annular space between the inside of the housing 11 and the outside of said filter element. The liquid fuel passes through the filter element and deposits any solid impurities on the exterior of said filter element. The filtered fuel passes out through the conduit 14. The flow of fuel may be reversed from that described but maintenance of the filter element, such as removing the deposited impurities, is not as satisfactory.

In the normal operation the axes of the inlet and outlet of the filter assembly are substantially vertical and therefore the axis of the housing 11 is inclined to the vertical. Any fuel tending to remain in the housing 11 due to this angle of inclination is scavenged through the aperture 47 and flows downwardly through the conduit 14.

The scavenging aperture 47 may take the form of a hole (as shown), slot or groove.

Having fully described my invention, it is to be understood that I do not wish to be limited to the details herein set forth or to the details illustrated in the drawings, but my invention is of the full scope of the appended claims.

I claim:
1. In a filter assembly of the class described, the combination of: an inclined housing having a first opening on one end and a second opening on a side intermediate the ends, said first and second openings having means for connecting conduits, a hollow filter element extending the length of said housing having an exterior surface communicating with said second opening and an interior surface communicating with said first opening, said filter element having longitudinally corrugated filter media means forming a substantial radial thickness of the filter element with externally and internally facing spaces between corrugations, said housing having a radially extending annular surface near said first opening of a radial width substantially equal to said filter element radial thickness for engaging and supporting an end of the filter element, a scavenging port extending downwardly from said annular surface toward and communicating with said first opening for draining fluid, and said filter element oriented and aligned with said scavenging port for communicating said scavenging port with substantially the lowest point in the lowermost one of said internally facing spaces between corrugations.

2. In a filter assembly of the class described, a combination of: an inclined cylindrical housing having a removable cover on the upper end, a first conduit connecting means on the lower end and a side opening including a second conduit connecting means, a generally cylindrical hollow filter element extending the length of said housing and having one end open to the said first conduit connecting means, said filter element having longitudinally corrugated filter media means forming a substantial radial thickness of the filter element with externally and internally facing spaces between corrugations, said housing having a radially extending annular surface near said first opening of a radial width substantially equal to said filter element radial thickness for engaging and supporting an end of the filter element, a scavenging port extending downwardly from said annular surface toward and communicating with said first conduit connecting means, and said filter element oriented and aligned relative to said scavenging port for communicating said scavenging port with substantially the lowest point in the lowermost one of said internally facing spaces between corrugations.

3. In a filter assembly of the class described, a combination of: an inclined cylindrical housing having a removable cover on the upper end, a first conduit connecting means on the lower end and a side opening including a second conduit connecting means, a generally cylindrical hollow filter element extending the length of said housing, the outside diameter of said filter element being smaller than the inside diameter of said cylindrical housing whereby an annular space is provided between said housing and said element, the lower end of said filter element being open to the lower end of said housing, said filter element having longitudinally corrugated filter media means forming a substantial radial thickness of the filter element with externally and internally facing spaces between corrugations, said housing having a radially extending annular surface near said housing lower end of a radial width substantially equal to said filter element radial thickness for engaging and supporting said lower end of the filter element, a scavenging port extending downwardly from said annular surface toward and communicating with said first conduit connecting means, and said scavenging port located and said filter element oriented relative to said scavenging port for communicating said scavenging port with substantially the lowest point in the lowermost one of said internally facing spaces between corrugations.

4. In a filter assembly of the class described, a combination of: a cylindrical housing having the axis inclined to a vertical axis, a bent cylindrical conduit axially aligned and connected at one end to the lower end of said housing and having the axis of the other end of said conduit substantially vertical, a second bent cylindrical conduit having one end connected to an opening in the cylindrical surface of the said housing and the axis of the other end substantially vertical and aligned with the vertical axis of the first bent cylindrical conduit, a generally cylindrical hollow filter element extending the length of the said housing and being coaxial therewith, the diameters of said housing and filter element being such that an annular space is defined between the inside of the housing and the outside of the filter element, sealing means to allow fluid flow between said annular space and said first conduit only through said filter element, said filter element having longitudinally corrugated filter media means forming a substantial radial thickness of the filter element with plural externally and internally facing spaces between corrugations, said housing having a radially extending annular surface near said housing lower end of a radial width substantially equal to said filter element radial thickness for engaging and supporting the lower end of the filter element, a scavenging opening extending downwardly from said annular surface toward and communicating with said conduit connected to the lower end of the housing, said scavenging opening appropriately located and said filter element appropriately oriented relative to said scavenging opening for communicating said scavenging opening with substantially the lowest point in the lowermost one of said internally facing spaces between corrugations, and the upper end of said cylindrical housing being removable to permit access to the said filter element.

5. In a filter assembly, the combination of: upper and lower vertically spaced terminal connections forming an inlet and an outlet for liquid flow, an inclined tubular housing having a lower end connected in open communication with the lower terminal connection, said housing having an inclined annular seat adjacent said lower end thereof, said housing having an open upper end, a removable closure for said upper end of the housing, the housing having a side opening between said ends thereof communicating with the upper terminal connection, an annular filter element insertable axially into the housing through the open end thereof in the absence of said closure, said filter element having an open lower end and a closed upper end, said filter element being provided with an end ring having a tapered end portion adapted to engage said inclined annular seat in sealing relationship, the interior of the filter element being in communication with the said lower terminal connection and the outside of the filter element being in communication with said side opening in the housing, said filter element having longitudinally corrugated filter media means forming a substantial radial thickness of the filter element with plural externally and internally facing spaces between corrugations, said end ring having a radially extending annular surface of a radial width substantially equal to said filter element radial thickness for engaging and supporting that end of the filter element, a scavenging aperture in said end ring extending downwardly from said annular surface toward and communicating with said lower terminal connection for gravity drainage of liquid therethrough, and said scavenging aperture appropriately located and said filter element appropriately oriented and aligned relative to said scavenging aperture for communicating said scavenging aperture with substantially the lowest point in the lowermost one of said internally facing spaces between corrugations.

References Cited in the file of this patent
UNITED STATES PATENTS

| | | |
|---|---|---|
| 798,741 | Mannix | Sept. 5, 1905 |
| 2,162,043 | Westlund | June 13, 1939 |
| 2,389,814 | Pond et al. | Nov. 27, 1945 |
| 2,422,647 | Vokes | June 17, 1947 |
| 2,456,292 | Manwaring | Dec. 14, 1948 |
| 2,554,748 | Lewis et al. | May 29, 1951 |
| 2,699,259 | Birkemeir | Jan. 11, 1955 |